United States Patent
Yazaki et al.

(10) Patent No.: US 7,315,547 B2
(45) Date of Patent: Jan. 1, 2008

(54) PACKET FORWARDING DEVICE

(75) Inventors: Takeki Yazaki, Hachioji (JP); Shinichi Akahane, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 548 days.

(21) Appl. No.: 11/032,159

(22) Filed: Jan. 11, 2005

(65) Prior Publication Data
US 2005/0281257 A1 Dec. 22, 2005

(30) Foreign Application Priority Data
Jun. 17, 2004 (JP) ............................. 2004-179612

(51) Int. Cl.
*H04L 12/28* (2006.01)
*H04L 12/56* (2006.01)
(52) U.S. Cl. ........................ 370/401; 370/389
(58) Field of Classification Search ............... 370/389, 370/392, 400, 401, 422
See application file for complete search history.

(56) References Cited

U.S. PATENT DOCUMENTS

| | | | | |
|---|---|---|---|---|
| 6,658,002 B1* | 12/2003 | Ross et al. | ................. | 370/392 |
| 6,874,016 B1* | 3/2005 | Gai et al. | ................. | 709/215 |
| 7,173,837 B1* | 2/2007 | Bettman et al. | ............. | 365/49 |
| 2004/0039845 A1* | 2/2004 | Feldmeier et al. | ......... | 709/245 |
| 2005/0213360 A1* | 9/2005 | Park | ........................... | 365/49 |
| 2005/0243818 A1* | 11/2005 | Foglar et al. | ............... | 370/389 |

FOREIGN PATENT DOCUMENTS

JP 2000-358064 6/1999

OTHER PUBLICATIONS

Uga et al., "A Flow Identification Method Using Content Addressable Memory", General Exhibition 2000 of the Institute of Electronics Information and Communication Engineers, p. 654, with 4 pages of English translation.

* cited by examiner

*Primary Examiner*—Ajit Patel
(74) *Attorney, Agent, or Firm*—Reed Smith LLP; Stanley P. Fisher, Esq.; Juan Carlos A. Marquez, Esq.

(57) ABSTRACT

There is provided a packet forwarding device which always carries out high-speed search in a routing table by using a TCAM. The device includes a CAM (120) which includes a first CAM entry (120-1) to set high order bits of destination address conditions and a second CAM entry (120-2) to set low order bits of the destination address conditions, a first search unit which compares high order bits of a destination address of an input packet with the first CAM entry to search for a matching destination address condition, and a second search unit which compares low order bits of the destination address of the packet with the second CAM entry to search for a matching destination address condition when no destination address condition corresponding to the high order bits of the destination address of the packet is uniquely decided based on a result of the search. Forwarding information of the packet is set based on a destination address condition uniquely corresponding to the destination address of the packet retrieved by one of the first and second search units.

10 Claims, 11 Drawing Sheets

TCAM 120

| ADDRESS | IP ADDRESS CONDITION HIGH ORDER/LOW ORDER BIT INFORMATION | KEY INFORMATION | BIT POSITION INFORMATION |
|---|---|---|---|
| 1 | 0 0 0 1 | * | 0 |
| 2 | 0 1 0 1 | * | 0 |
| 3 | 0 1 0 1 | * | 0 |
| 4 | 0 0 0 1 | * | 0 |
| 5 | 0 0 0 0 | * | 0 |
| 6 | 0 1 0 * | * | 0 |
| 7 | 0 1 0 0 | 0 | 1 |
| 8 | 0 1 0 * | 1 | 1 |
| 9 | 1 * * * | 1 | 1 |
| 10 | * * * * | * | 1 |
| 11 | * * * * | * | 1 |
| 12 | * * * * | * | 1 |

Rows 1–6: TCAM FOR HIGH ORDER BIT 120-1 (121-1 … 121-6)
Rows 7–12: TCAM FOR LOW ORDER BIT 120-2 (131-1 … 131-6)

FIG.6 set_prefix_length 4

FIG.7

INTERMEDIATE SEARCH TABLE A 140

| ADDRESS | SEARCH CONTINUATION INFORMATION | KEY INFORMATION | TABLE ADDRESS | |
|---|---|---|---|---|
| 1 | 1 | 0 | 4 | 141-1 |
| 2 | 1 | 1 | 6 | 141-2 |
| 3 | 1 | 1 | 6 | 141-3 |
| 4 | 0 | - | 4 | 141-4 |
| 5 | 0 | - | 5 | 141-5 |
| 6 | 0 | - | 6 | 141-6 |

FIG.8

INTERMEDIATE SEARCH TABLE B 150

| ADDRESS | SEARCH CONTINUATION INFORMATION | KEY INFORMATION | TABLE ADDRESS | |
|---|---|---|---|---|
| 1 | 0 | - | 1 | 151-1 |
| 2 | 0 | - | 2 | 151-2 |
| 3 | 0 | - | 3 | 151-3 |
| 4 | - | - | - | 151-4 |
| 5 | - | - | - | 151-5 |
| 6 | - | - | - | 151-6 |

FIG.9

SEARCH RESULT TABLE 160

| ADDRESS | NEXT HOP IP ADDRESS | OUTPUT PORT NUMBER | |
|---|---|---|---|
| 1 | A | 1 | 161-1 |
| 2 | B | 3 | 161-2 |
| 3 | C | 2 | 161-3 |
| 4 | D | 4 | 161-4 |
| 5 | E | 4 | 161-5 |
| 6 | F | 2 | 161-6 |

| | IP ADDRESS CONDITION | NEXT HOP IP ADDRESS |
|---|---|---|
| 1401-1 | 0 1 1 1 0 * * * | A |
| 1401-2 | 1 1 0 1 0 * * * | B |
| 1401-3 | 0 1 1 0 0 * * * | C |
| 1401-4 | 0 0 0 1 * * * * | D |
| 1401-5 | 0 1 0 * * * * * | E |

FIG.13

ROUTING TABLE 1100

| | IP ADDRESS CONDITION | NEXT HOP IP ADDRESS |
|---|---|---|
| 1101-1 | 0 0 0 1 0 1 0 0 | A |
| 1101-2 | 0 1 0 1 0 1 0 * | B |
| 1101-3 | 0 1 0 1 1 * * * | C |
| 1101-4 | 0 0 0 1 * * * * | D |
| 1101-5 | 0 0 0 0 * * * * | E |
| 1101-6 | 0 1 0 * * * * * | F |

IP ADDRESS CONDITION

0 1 0 * * * * *

PREFIX    MASK

FIG.14

FIG.15

PACKET FORWARDING DEVICE

CLAIM OF PRIORITY

The present application claims priority from Japanese application P2004-179612 filed on Jun. 17, 2004, the content of which is hereby incorporated by reference into this application.

BACKGROUND

This invention relates to a packet forwarding device which includes a high-speed routing table search unit, and more particularly to a packet forwarding device which realizes a high speed of routing table search by using a CAM.

A router that constitutes an Internet Protocol (IP) network judges an IP address (next hop IP address) of a forwarding destination network device from a destination IP address of an input packet, and forwards the packet to an output line which reaches the network device.

To judge the next hop IP address, the router includes a routing table for storing a plurality of routing entries containing prefixes which are IP address high order bits and indicate networks, and next hop IP addresses corresponding to the prefixes. Upon the input of the packet, the router searches for a routing entry in which the prefix of each entry matches high order bits of a destination IP address in a header, and judges a next hop IP address in the matched routing entry to be a next hop IP address of the input packet.

When a plurality of routing entries match, a routing entry in which a bit length of a prefix (prefix length) is longer is judged to be a matched routing entry. Hereinafter, a series of these judging operations will be referred to as routing table search.

Figure 13:
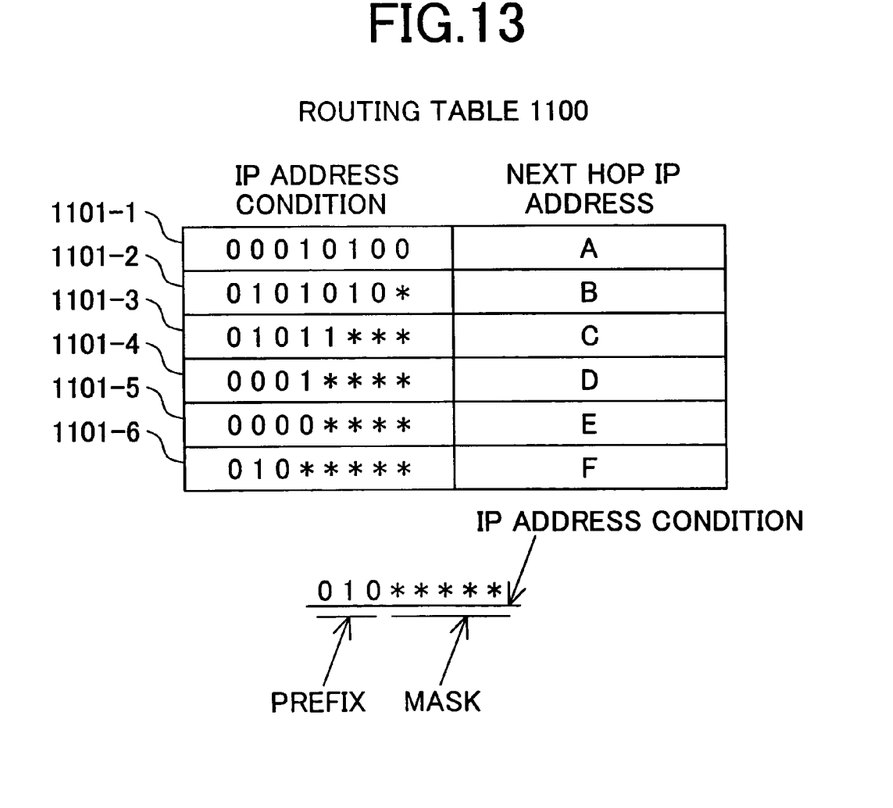
FIG. 13 is an explanatory diagram showing an 8-bit routing table which includes six routing entries.

The routing table search will specifically be described by using a routing table shown in FIG. 13. FIG. 13 shows a case in which there are six routing entries 1101-1 to 1101-6 in a routing table 1100 when an. IP address is represented by 8 bits. Each routing entry 1101 includes an IP address condition which is information equivalent to a prefix, and a next hop IP address which corresponds to each IP address condition. The IP address condition is information in which a prefix is represented by high order bits and remaining bits of an IP address are represented as a mask (*).

For example, consideration will be given to a case in which a packet of a destination IP address represented by a binary number "00010100" is input to the router. In routing table search in this case, IP address conditions and IP destination addresses of the routing entries 1101-1 and 1101-4 match each other, but a next hop IP address: A in the routing entry 1101-1 in which a prefix length is longer is judged to be a next hop IP address of the input packet.

To realize a high speed of the routing table search, there has been presented a routing table search method which uses a Ternary Contents Addressable Memory (TCAM) as a high-speed searching device. For example, "Flow Identification Method Using Content Addressable Memory (CAM)", by MASANORI Uga, KOHEI Shiohira, p. 654, SB-4-2, 2000 General Convention Lecture Collected Papers, Institute of Electronics, Information and Communication Engineers, (hereinafter, referred to as "Nonpatent Document 1") describes a method of realizing routing table search and a flow identification process by the TCAM at a high speed.

The TCAM includes a plurality of entries which store a plurality of bits of matching conditions, executes match comparison between a search key and matching conditions in the entries upon an input of the search key, and outputs a smallest address value among addresses of the matched entries at a high speed. Moreover, according to the TCAM, it is possible to designate not only "0" or "1" for each bit of a matching condition but also a mask ("*") which indicates that a search key may be either "0" or "1".

The routing table searching method of the Nonpatent Document 1 includes a TCAM which stores IP address conditions of routing entries in long order of prefix lengths, and a search result table which stores next hop IP addresses corresponding to the IP address conditions.

A mask part of the IP address condition corresponds to a mask of the TCAM. According to the routing table searching method, upon an input of a packet, a destination IP address in a packet header is input as a search key to the TCAM included therein. The TCAM compares the search key with the set IP address conditions, and judges a smallest address among addresses in which matched IP address conditions are stored. The routing table searching method judges a next hop IP address of the search result table corresponding to the address, to be a next hop IP address of the input packet. The TCAM can perform high-speed search irrespective of the number of set entries, i.e., the number of IP address conditions.

Figure 14:
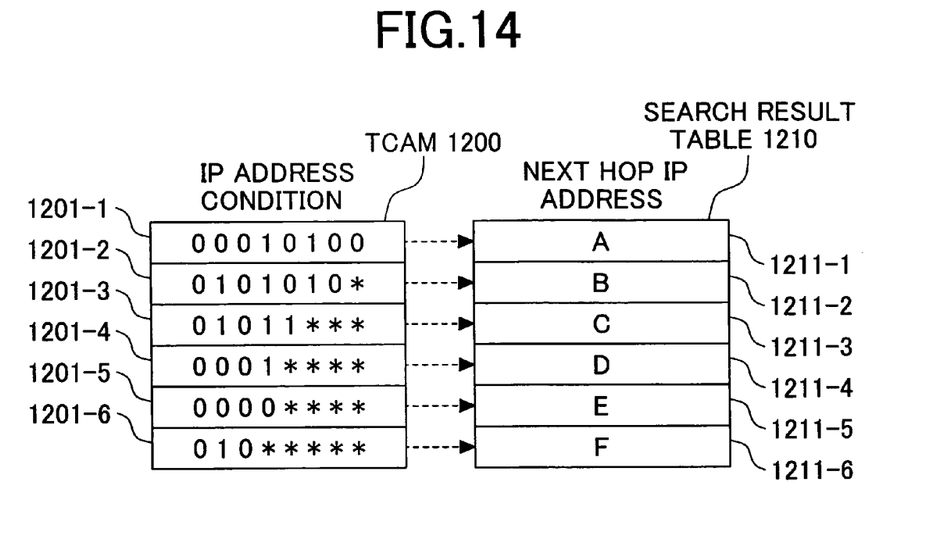
FIG. 14 is an explanatory diagram showing an example of a conventional routing table search.

Referring to a conceptual diagram of FIG. 14, a routing table search unit to which the Nonpatent Document 1 is applied will be described. The routing table search unit of FIG. 14 includes a TCAM 1200 in which the IP address conditions of the six routing entries shown in FIG. 13 are set as IP address conditions 1201-$i$ in order of prefix lengths, and a search result table 1210 which stores next hop IP addresses corresponding to the IP address conditions 1201-$i$ ($i$=1 to 6) as next hop IP addresses 1211-$i$ ($i$=1 to 6).

For example, when a packet of a destination IP address "00010101" is input, the TCAM 1200 of the routing table search unit compares the destination IP address with the IP address conditions 1201-$i$, and outputs a smallest address "2" among matched IP address conditions 1201.

The routing table search unit judges a next hop IP address: B corresponding to the address "2" of the search result table 1210 to be a next hop IP address of the input packet.

However, in realization of a high speed of the routing table searching method which uses the TCAM, search performance of the TCAM first becomes a bottleneck.

Additionally, when the routing table search unit includes a TCAM and a CAM control device such as an ASIC or a network processor, an input bandwidth of a search key between the TCAM and the CAM control device becomes a bottleneck.

According to the Nonpatent Document 1, since all the bits of the destination address of the received packet are always input as a search key to the TCAM, an input bandwidth of the search key is consumed to a maximum. Furthermore, since the TCAM executes match comparison of the long search key with the entries therein, search resources are consumed to a maximum. Accordingly, there is a problem in that when the search performance of the TCAM or the input bandwidth of the search key between the TCAM and the CAM control device becomes a bottleneck, only worst search performance is realized.

As a routing table searching method that eliminates the bottleneck of the CAM search performance, there has been known a technique disclosed in JP 2000-358064A which uses a plurality of CAMs. According to JP 2000-358064 A, routing table search is carried out in two stages. The first search is executed at a unit of the first stage by using a Contents Addressable Memory (CAM), and the second search is executed by arranging a tree at a unit of the second stage. The unit of the first stage includes a CAM for each group based on a prefix length of a routing entry. Only bits of a shortest prefix length in the routing entries of each group are stored in the CAM. At the time of search, bits of a destination IP address corresponding to bits set in each CAM are input, and the CAM outputs an address of a tree-stored memory corresponding to a matched entry. The unit of the second stage executes tree search based on the address, and decides a next hop IP address.

SUMMARY

According to JP 2000-358064 A, the bottleneck regarding the search performance of the CAM can be eliminated by disposing the plurality of CAMs. However, the bottleneck regarding the input bandwidth of the search key cannot be eliminated. This problem will be described by using a case in which an IP address is 8 bits as shown in FIG. 14, and for example, routing entries (1201-3 to 1201-6) of 3 to 5-bit prefix lengths of IP addresses are set in a first CAM and routing entries (1201-1 and 1201-2) of 6 to 8 bits are set in a second CAM.

In the case of matching a prefix length with the 7-bit entry 1201-2, since search need be executed only in the second CAM, only high order 6 bits of a destination IP address need be input to the second CAM. However, in the case of matching with the 4-bit entry 1201-5, in addition to the 6 bits, 3-bit information that has been input to the second CAM must be input to the first CAM. Thus, according to JP 2000-358064 A, the bits of the same IP address must be input to the CAM by a plurality of times. Accordingly, there is a problem in that search performance deterioration is increased when the input bandwidth of the search key between the CAM and the CAM control device becomes a bottleneck.

This invention has been made in view of the above-mentioned problems, and it is therefore an object of this invention to perform high-speed search in a routing table by inputting information of a destination IP address input to a CAM only once to effectively use an input bandwidth of a search key between a CAM and a CAM control device.

According to this invention, to realize a high speed for routing table search which uses a CAM, a high order bit of a destination address condition is set as a first TCAM entry in a TCAM in which a mask can also be set. Upon an input of a packet, the first search is carried out to compare high order bits of a destination address of the packet with the first TCAM entry. At this time, when a matched destination address condition can be uniquely specified, the search is finished, and forwarding information such as a next hop destination address or an output port number corresponding to the destination address condition is set as forwarding information of the packet. Further, the routing table search unit includes a search result table which stores forwarding information such as a next hop destination address or an output port number in a routing entry, and a first intermediate search table which stores search continuation information to indicate necessity of search continuation after the first search uniquely corresponding to the first TCAM entry and key information uniquely corresponding to the first TCAM entry in association with a search result of the first search.

Search is carried out in a first CAM entry by the first search. When search continuation information corresponding to a matched first CAM entry is "CONTINUATION UNNECESSARY", forwarding information uniquely corresponding to the matched CAM entry is judged to be forwarding information of the packet. On the other hand, in the case of "CONTINUATION NECESSARY", a second search unit executes search by using read key information, low order bits of the destination address, and low order bits of a destination address condition to judge forwarding information of the packet. For example, the second search unit sets key information decided by high order bits and low order bits of the destination address condition as a second TCAM entry in a second TCAM, and searches in the second TCAM entries by using the key information read by the first search unit and the low order bits of the destination address. When there is a matched second TCAM entry, forwarding information in the search result table uniquely corresponding to the TCAM entry is judged to be forwarding information of the packet. When there is no matched second TCAM entry, the forwarding information in the search result table uniquely corresponding to the matched TCAM entry in the first search is judged to be forwarding information of the packet.

Thus, according to this invention, the high order bits of the destination address is partially input as a search key without inputting all the destination addresses to the TCAM, and the short search key is compared for matching with the first TCAM entry. At this time, when the search can be finished, i.e., when the search continuation information is "CONTINUATION UNNECESSARY", the short search key need be input only once, and only corresponding TCAM search need be executed. Consequently, it is possible to reduce an in input bandwidth of the search key while effectively utilizing search performance of the TCAM.

Even in the case of "CONTINUATION NECESSARY", search is executed by using only the low order bits of the destination address. When the second search unit is realized by a TCAM, since search is executed by using low order bits of a destination address, it is not necessary to input a search key similar to that of the first search again to the TCAM. Consequently, an input bandwidth of the search key is limited to a minimum, whereby a high speed is achieved for routing table search.

DETAILED DESCRIPTION OF THE PREFERRED EMBODIMENTS

Next, referring to the accompanying drawings, a preferred embodiment of this invention will be described.

Figure 1:
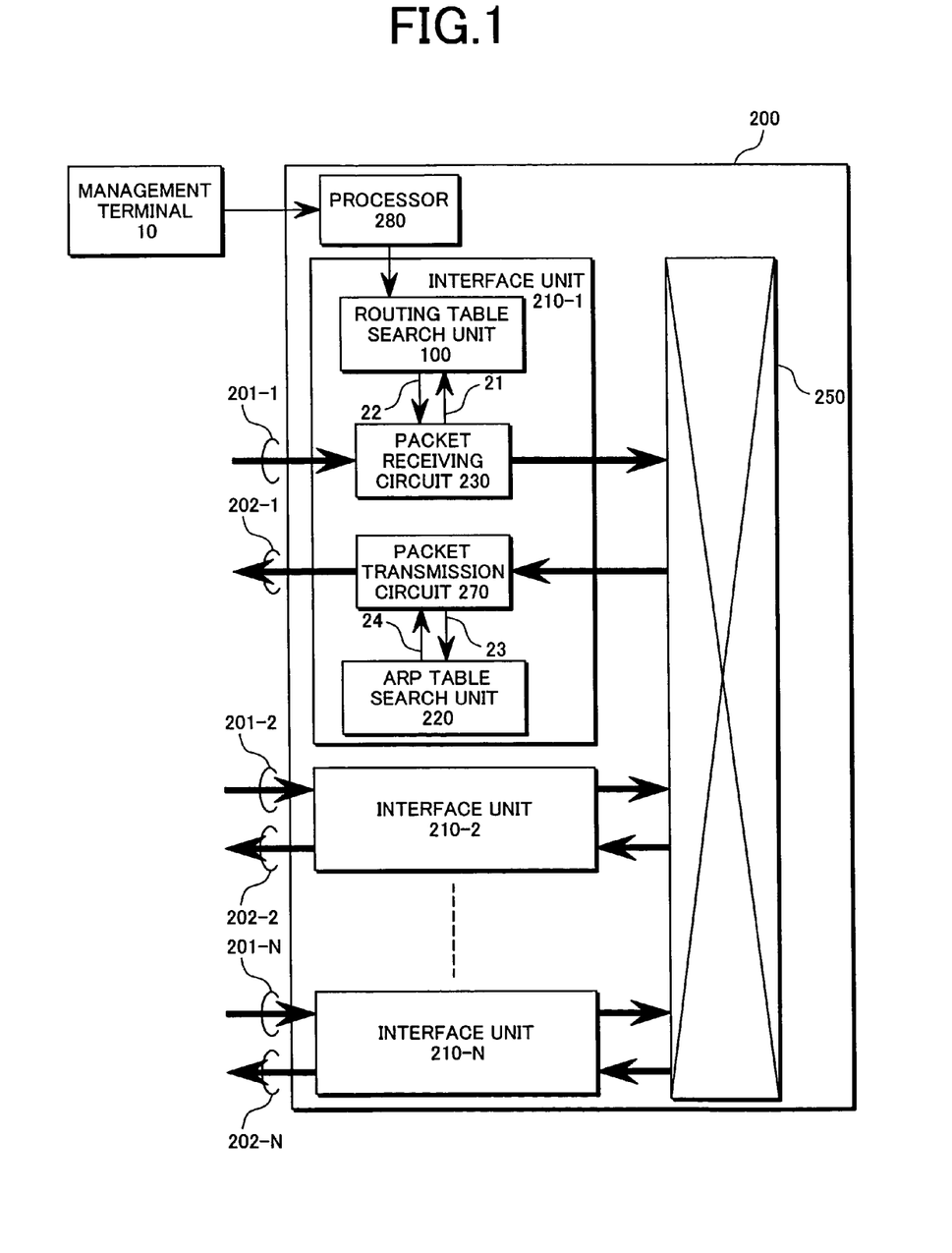
FIG. 1 is a block diagram showing a router according to an embodiment of this invention.

FIG. 1 shows a router which includes a routing table search unit according to this invention. Hereinafter, referring to FIGS. 1, 2, and 3, an outline of an operation of the router will be described.

FIG. 1 is a block diagram showing a router 200 of this invention. The router 200 includes N input lines 201-i (i=1 to N) through which packets are input, N output lines 202-i (i=1 to N), N interface units 210-i (i=1 to N), a packet switch unit 250 which couples the interface units 210-i, and a processor 280. The processor 280 receives a command from a management terminal 10.

Each of the interface units 210-i includes a packet receiving circuit 230 which receives a packet, a routing table search unit 100 special to this invention which judges a next hop IP address of the packet and a number of a line (output port number or port number) to output the packet based on a destination IP address of the input packet and outputs those pieces of information to the packet receiving circuit 230, a packet transmission circuit 270 which transmits the packet received from the packet switch unit 250, and an Address Resolution Protocol (ARP) table search unit 220 which shows a correlation between an MAC address and an IP address.

Figure 2:
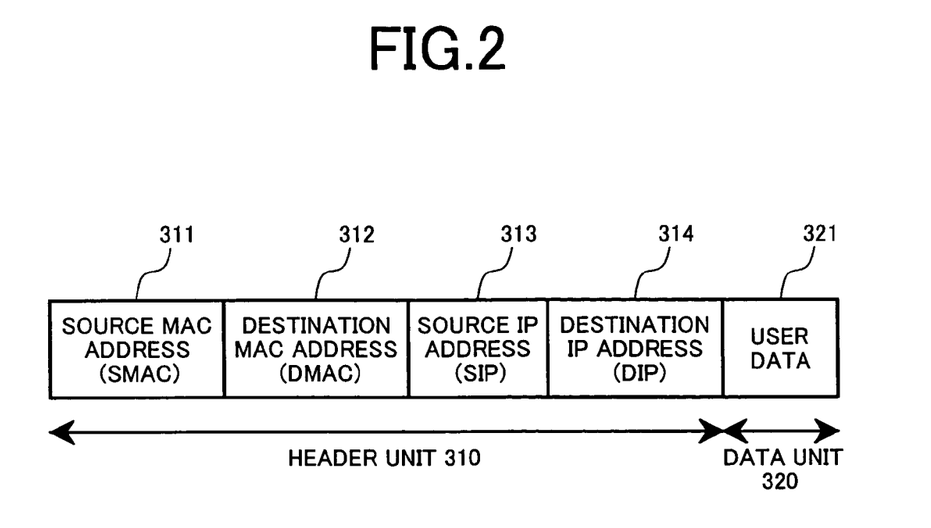
FIG. 2 is an explanatory diagram showing a format of a packet transferred between the router and an external device.

FIG. 2 shows an example of a format of a packet input/output through the input line 201-i, the output line 202-i. The format includes a header unit 310 and a data unit 320. The header unit 310 includes a source MAC address ("SMAC") 311 which is a source address of a data link layer, a destination MAC address ("DMAC") 312 which is a destination address, a source IP address ("SIP") 313 which is a source address (address of transmission terminal) of a network layer, and a destination IP address ("DIP") 314 which is a destination address (address of receiving terminal).

Figure 3:
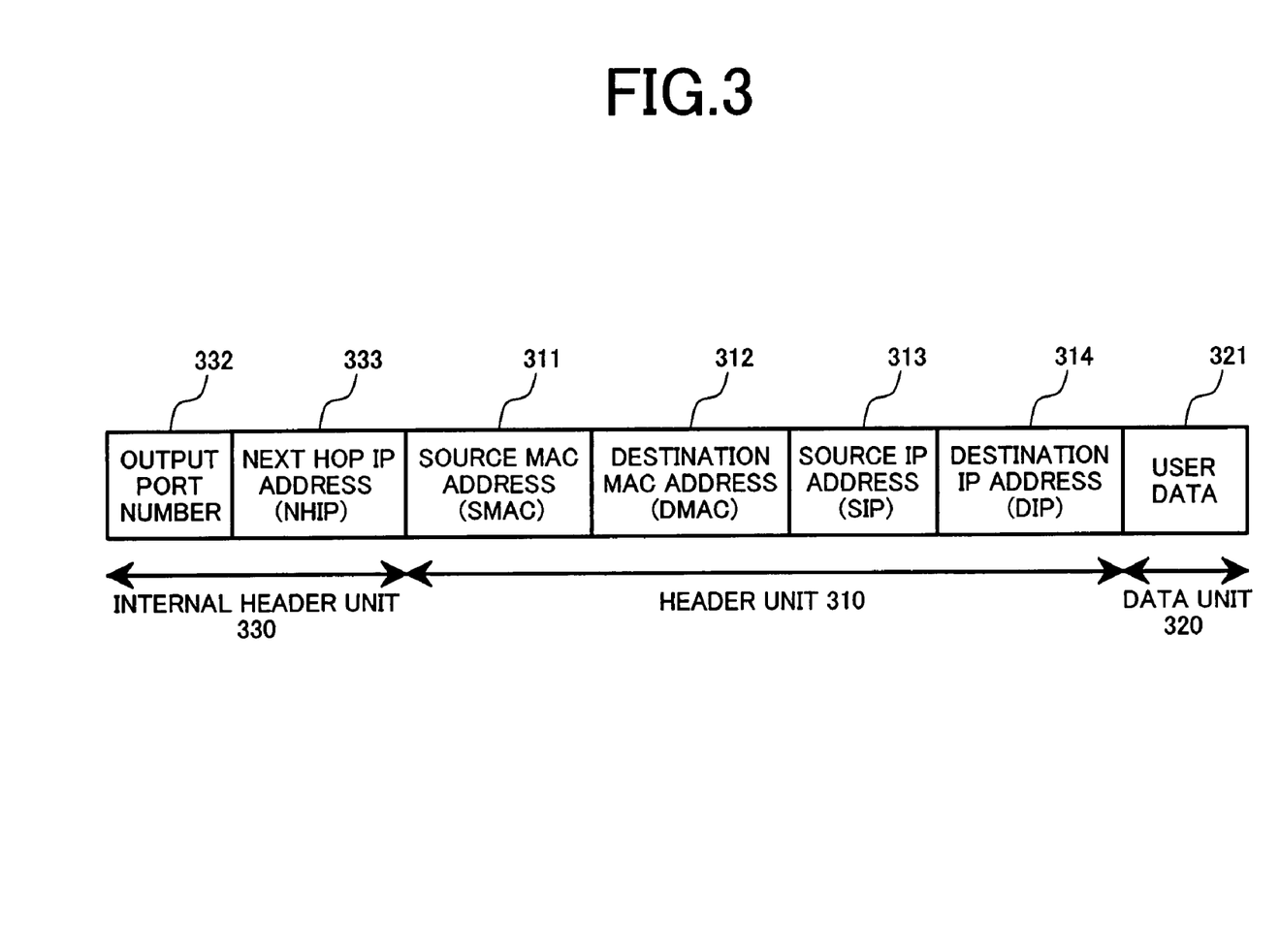
FIG. 3 is an explanatory diagram showing a format of a packet transferred in the router.

FIG. 3 shows an example of a packet format in the router 200 of this invention. This format is constituted by adding an internal header unit 330 to the packet format of FIG. 2.

The internal header unit 330 includes an output port number 332 which is a number of a line to output an input packet, and a next hop IP address ("NHIP") 333 which is an IP address of a next hop (router or terminal) to receive the packet.

Upon an input of a packet through the input line 210-i, the packet receiving circuit 230 adds the internal header unit 330 to store the packet, and transmits the DIP 314 in the header unit 310 as destination IP address information 21 to the routing table search unit 100.

The routing table search unit 100 judges a number of an output line (output port number) to output a packet and a next hop IP address from the DIP 314 in the destination IP address information 21, and transmits them as packet output line information 22 to the packet receiving circuit 230.

The packet receiving circuit 230 writes the output port number and the next hop IP address of the packet output line information 22 in fields of the output port number 332 and the NHIP 333, and transmits the packet to the packet switch unit 250.

The packet switch unit 250 that has received the packet transmits the packet to the packet transmission circuit 270 of the interface unit 210-i corresponding to the output port number 332. The packet transmission circuit 270 stores the packet, and simultaneously transmits the NHIP 333 of the internal header unit 330 as next hop IP address information 23 to the ARP table search unit 220.

The ARP table search unit 220 judges a next hop MAC address which contains the next hop IP address information 23, and transmits the next hop MAC address as MAC address information 24 to the packet transmission circuit 270.

The packet transmission circuit 270 that has received the next hop MAC address information 24 writes an MAC address within the next hop MAC address information 24 into a DMAC 312 and an MAC address of the input/output line of the interface unit 210-i into an SMAC 311, deletes the internal header unit 330, and transmits the stored packet through the output line 202.

Next, a detailed operation of the routing table search unit 100 of this invention shown in FIG. 4 will be described. According to this embodiment, an IP address is represented by 8 bits to simplify explanation, and a case of FIG. 13 in which there are six routing entries will be described.

When the IP address is represented by 32 bits of an IP version 4 or 128 bits of an IP version 6, a searching process described below can be similarly executed.

Figure 15:
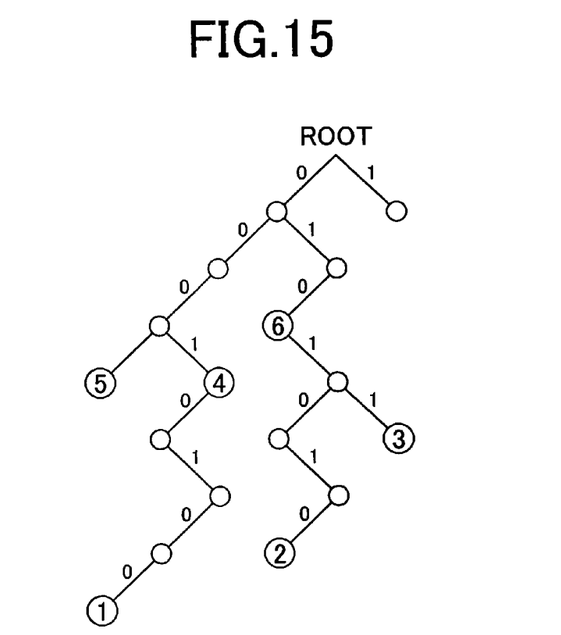
FIG. 15 is an explanatory diagram showing six routing entries in a tree structure.

FIG. 15 shows a tree of a routing entry 1101 in which an IP address is represented by 8 bits and there are six routing entries as shown in FIG. 13. Routing entries 1101-1 to 1101-6 correspond to nodes "1" to "6".

In the drawing, a root is connected to nodes indicated by circles by two branches to which 0 and 1 are allocated. Further, the node is connected through a branch to a lower (located lower in the drawing) node. Each node corresponds to an IP address condition in which values allocated to branches from the root to the node are arrayed in order and bits not reaching 8 bits are represented by a mask (*).

For example, a node "4" in the drawing corresponds to an IP address condition "0001****" as it can be reached by tracing branches 0→0→0→1 from the node.

The routing entries 1101-1 to 1101-6 of FIG. 13 corresponds to the nodes "1" to "6" of FIG. 15. The node 2 on a route to reach the node 1 is called a parent node, and the node 1 is called a child node to the node 2. According to this embodiment, a routing entry of a parent node seen from a routing entry corresponding to a child node is called a parent routing entry. For example, in FIG. 13, the routing entry 1101-6 is a parent routing entry of the routing entry 1101-2.

Figure 4:
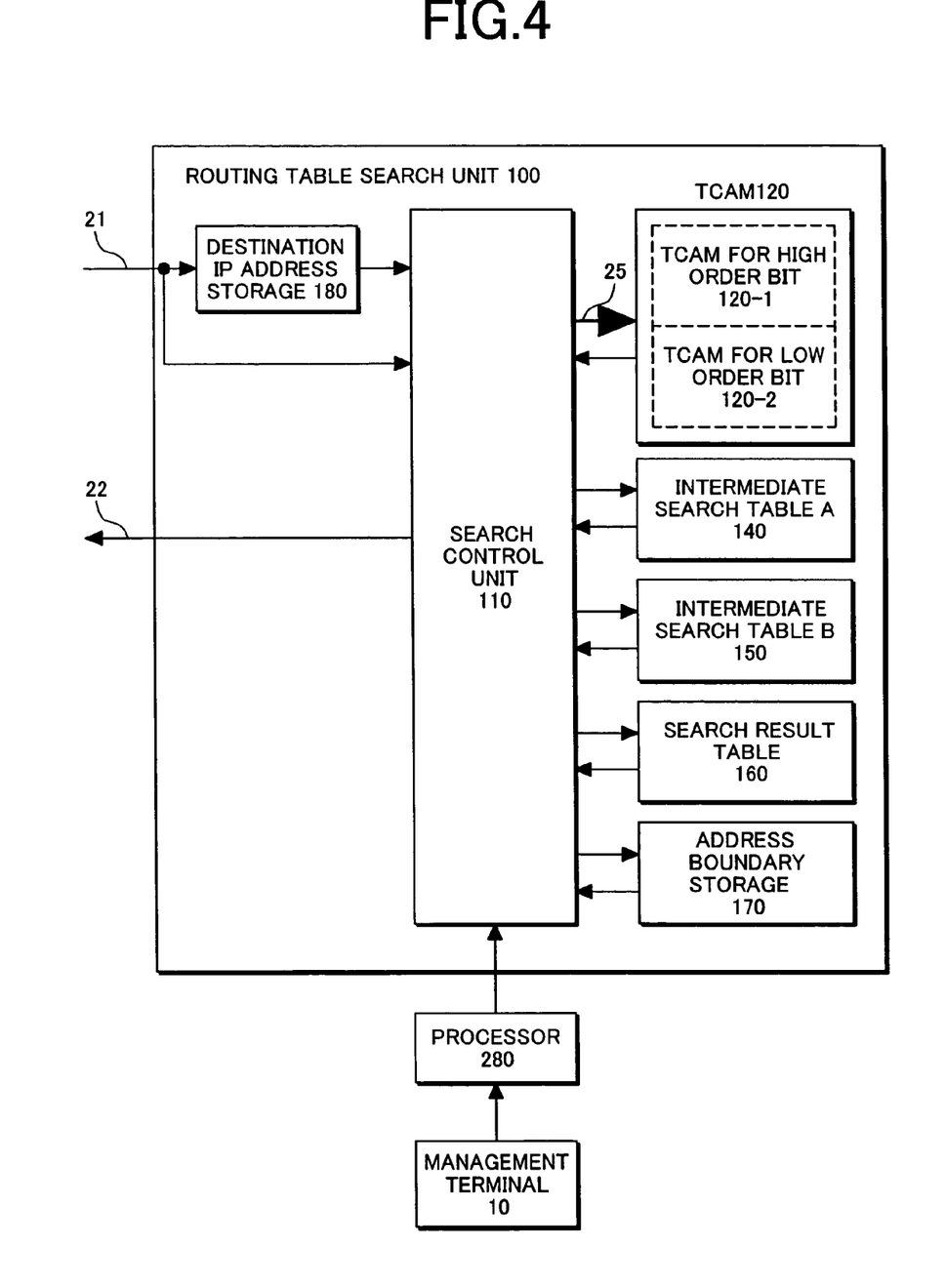
FIG. 4 is a block diagram showing a constitution of a routing table search unit of the router.

FIG. 4 is a block diagram showing the routing table search unit 100 of this invention. The routing table search unit 100 includes a destination IP address storage 180 which stores destination IP address information 21, a TCAM for high order bits 120-1 in a TCAM 120 which sets high order bits of an IP address condition of a routing entry, a TCAM for low order bits 120-2 in the TCAM 120 which stores low order bits of the IP address condition, an intermediate search table A 140 and an intermediate search table B 150, a search result table 160 which stores a next hop IP address and an output port number, an address boundary storage 170 in which a bit length of high order bits of an IP address is set, and a search control unit 110 which judges a next hop IP address and an output port number of a packet input to the router 200 based on information stored in the TCAMs 120, the tables 140, 150, 160, and 170 and the destination IP address storage 180.

The routing table search unit 100 of this invention logically divides one TCAM 120 into a TCAM 120-1 and a TCAM 120-2, and compares high order bits of a destination IP address for matching with an IP address condition high order bits which is high order bits of an address condition in a restricted manner by using the divided TCAM 120-1.

At this time, when an IP address condition to be matched can be judged, a next hop IP address and an output port number are read from the search result table 160 to finish the searching process.

When an IP address condition to be matched cannot be judged, low order bits of the destination IP address is compared for matching with low order bits of the IP address condition again by using the TCAM 120-2, and an IP address condition to be matched is judged.

When the searching process is finished only by the high order bits search, the high order bits alone is input as a search key to the TCAM 120-1, and the TCAM 120-1 only need execute search by the search key of the high order bits amount. Thus, the routing table search unit 100 of this invention can effectively use search resources of the TCAM 120.

Furthermore, when the routing table search unit 100 is realized by the TCAM 120 and a CAM control device such as ASIC, it is possible to realize a high speed for routing table search by effectively utilizing a bandwidth of a signal line 25 of FIG. 4 between the TCAM 120 and the CAM control device.

The case in which information in the address boundary storage unit 170 is "4" (i.e., when a length of an IP address is 8 bits, a high order bits length and a low order bits length are both 4 bits) has been described. However, even for other bit lengths, the following searching process can be similarly carried out.

Figure 5:
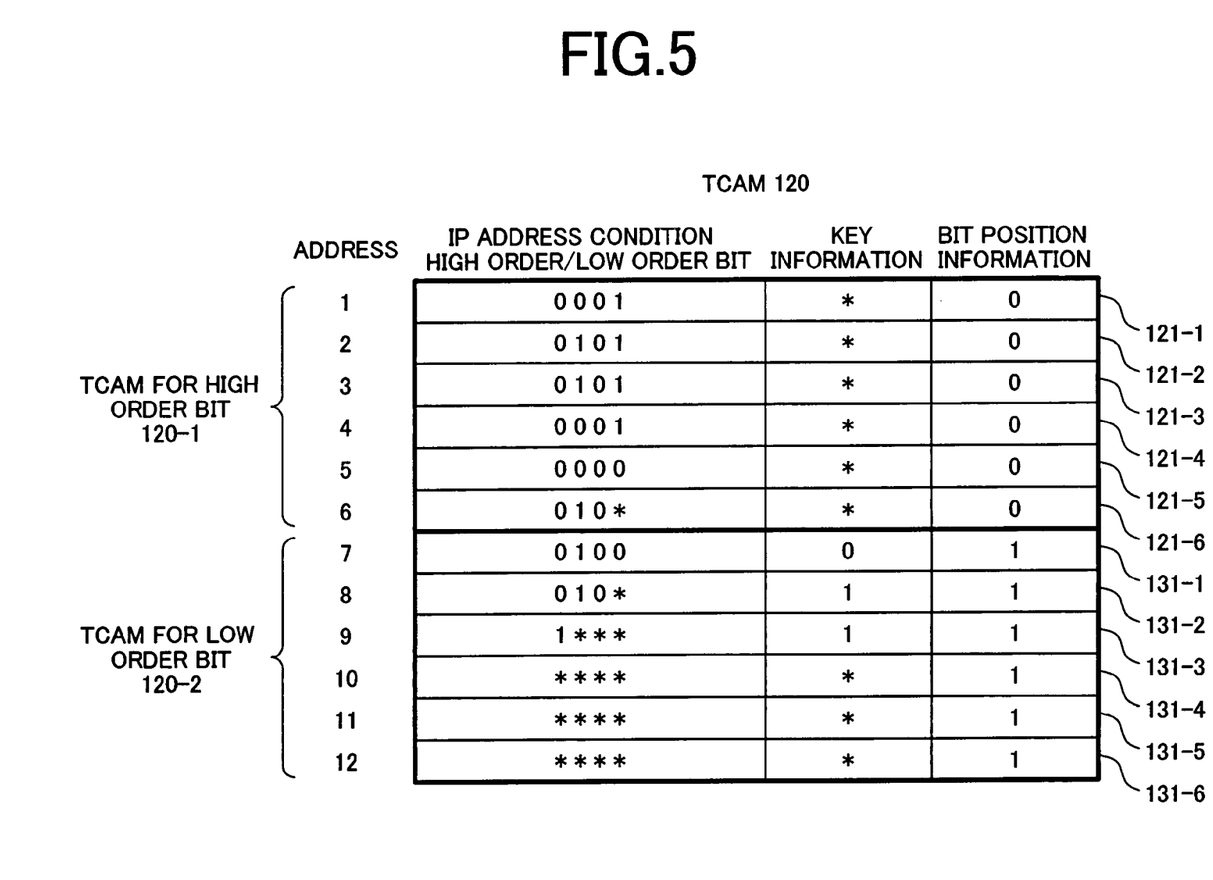
FIG. 5 is an explanatory diagram showing a constitution of a TCAM of the routing table search unit.
Figure 9:
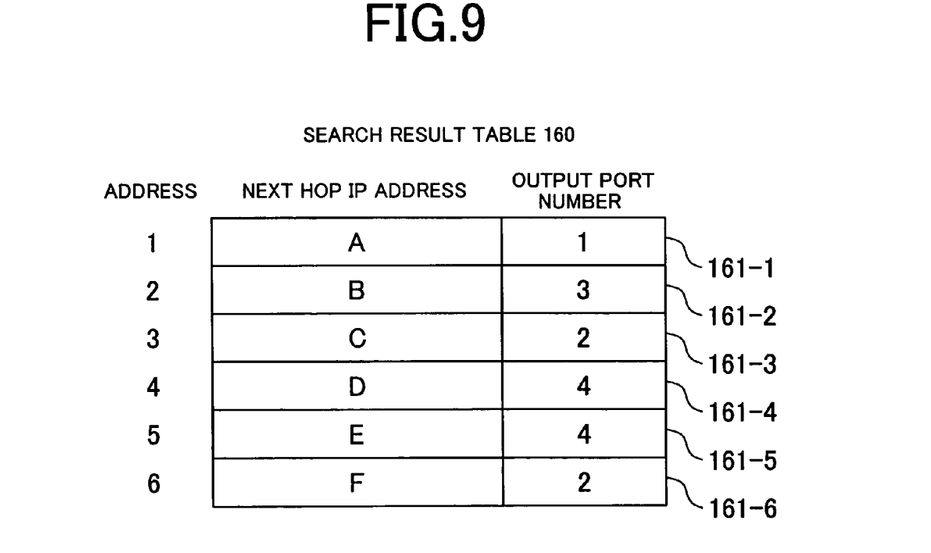
FIG. 9 is an explanatory diagram showing a format of a search result table.

FIG. 5 shows formats of the TCAM 120-1 and the TCAM 120-2 when a bit length of high order bits is "4", and FIG. 9 shows a format of the search result table 160. High order 4 bits of the IP address condition of each routing entry are set in entries 121-$i$ ($i$=1 to 6) of the TCAM 120-1, and low order 4 bits of the IP address condition are set in entries 131-$i$ ($i$=1 to 6) of the TCAM 120-2.

In the search result table 160 shown in FIG. 9, output port numbers corresponding to next hop IP addresses are set in long order of prefix lengths of routing entries. For example, an IP address condition "01011***" and a next hop IP address "C" of the routing entry 1101-3 of FIG. 13 are set by being divided into an entry 121-3 of the TCAM for high order bits 120-1, an entry 131-3 of the TCAM for low order bits 120-2, and an entry 161-3 of the search result table 160.

In FIG. 5, bit position information of the TCAM 120 indicates bit positions of IP address 4 bits set as an IP address condition, "0" represents high order bits, and "1" represents low order bits.

During search in the TCAM 120, by adding bit position information to other search keys to execute the search, the TCAM 120 can be logically divided into two, i.e., the TCAM 120-1 and the TCAM 120-2.

The key information is an identifier in which the high order bits of the IP address conditions are compressed to a smaller number of bits (e.g., 1 bit), and used when low order bits are searched for. Accordingly, key information of the TCAM for high order bits 120-1 always becomes a mask (*).

When IP address condition high order bits in the entries 121 of the TCAM for high order bits 120-1 are equal, an entry 121 having larger addresses of the TCAM 120 can be omitted. It is because when matching is discovered with an entry 121 having a smaller address before matching with an entry 121 having a larger address, the setting of the entry is meaningless. For example, IP address condition high order bits of the entry 121-2 and the entry 121-3 are both "0101", so the entry 121-3 can be omitted. Additionally, it is possible to omit entries 131-4 to 131-6 in which IP address condition low order bits of the TCAM for low order bits 120-2 are all masks.

Figure 10:
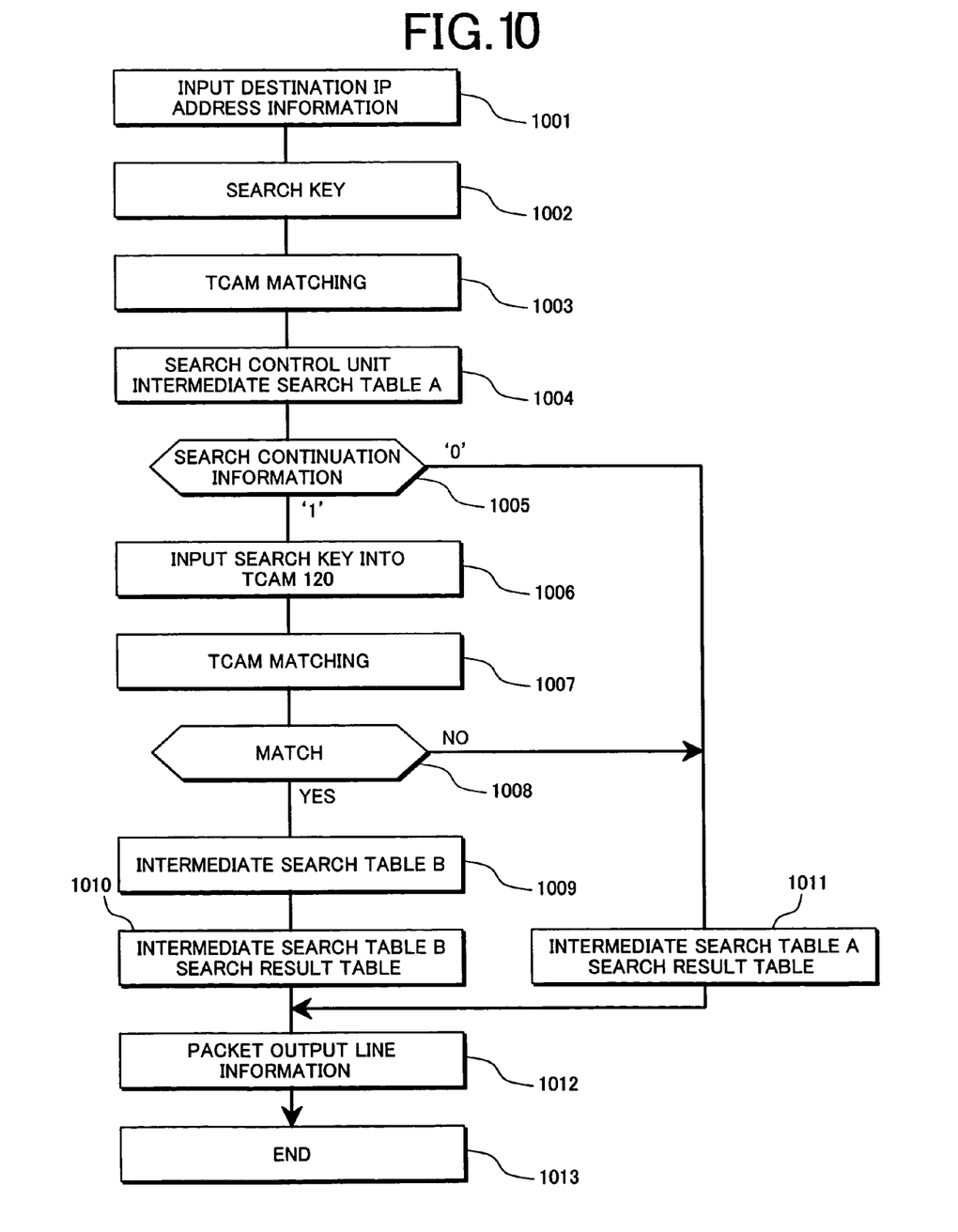
FIG. 10 is a flowchart showing an example of a process executed in the routing table search unit.

FIG. 10 is a flowchart showing an example of a process carried out by the routing table search unit 100. For example, the process is triggered by an input from the packet receiving circuit 230.

First, upon an input of destination IP address information 21 to the routing table search unit 100, the destination IP address storage 180 stores the information, and the search control unit 110 starts routing table search (step 1001).

The search control unit 110 refers to the address boundary storage 170 to obtain a bit length of high order bits, and reads a destination IP address equivalent to the high order bits amount (4 bits according to this embodiment) from the destination IP address storage 180.

Then, the read information, information equivalent to a bit length amount of key information of the TCAM 120 and bit position information "0" indicating an input of high order bits of a destination IP address shown in FIG. 5 are input as search keys to the TCAM 120 (step 1002).

The key information may take an optional value since a mask "*" is set in the key information of the entry 121-$i$. Upon an input of the search key from the search control unit 110, the TCAM 120 executes match comparison with the set entry 121-$i$, and outputs a smallest (bit length of a prefix part is large) address among addresses of matched entries 121-$i$ to the search control unit 110 (step 1003).

The search control unit 110 that has received the address from the TCAM 120 reads information corresponding to the address from the intermediate search table A 140 (step 1004).

Figure 7:
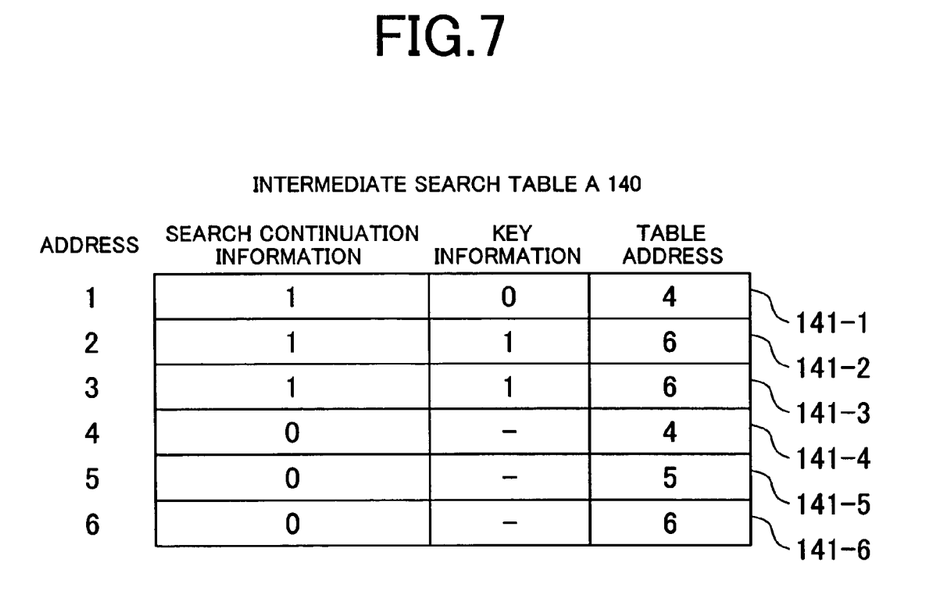
FIG. 7 is an explanatory diagram showing a format of an intermediate search table A.

FIG. 7 shows a format of the intermediate search table A 140, and a set value when there is a routing entry 1101 of FIG. 13. Each of the entries 141-$i$ ($i$=1 to 6) of the intermediate search table A 140 includes search continuation information, key information, and a table address.

The search continuation information indicates search continuation necessity by low order 4 bits of the destination IP address ("YES"=1, "NO"=0). When IP address condition high order bits having a prefix length of 4 or less is matched, IP address conditions not compared for matching are all masks, and it can be judged that matching has been made with the IP address condition.

Thus, search continuation information corresponding to the IP address condition in which the prefix length is 4 bits or less becomes "0".

On the other hand, search continuation information corresponding to an IP address condition in which a prefix length is 5 bits or more becomes "1" because a matched IP address condition cannot be judged. For example, matching with the routing entry 1101-1 of FIG. 13 cannot be judged unless low order bits of the destination IP address are compared with the IP address condition low order bits "0100".

The key information is an identifier in which IP address condition high order bits are compressed to a smaller bit length, and used for later search of the TCAM 120-2. In FIG. 7, key information corresponding to "0001" (table address=1) of the entry 121-1 of the TCAM 120-1 is "0", and key information corresponding to "0101" (table addresses=2, 3) of the entries 121-2 and 121-3 is "1".

The table address of the intermediate search table A 140 is an address of the search result table 160 to be referred to. When the search continuation information is "0", the table address corresponds to a routing entry corresponding to the entry 121 of the TCAM 120-1 matched in the step 1003.

Accordingly, the table address becomes an address in which a next hop IP address and an output port number of the routing entry are stored. For example, a table address of the entry 141-5 corresponding to the entry 121-5 becomes "5".

A table address of the entry **141-*i* whose search continuation information is "1" indicates an address of the search result table 160** to be referred to when there is no matched IP address condition in which a prefix length is 5 bits or more as a result of match comparison for low order bits.

For example, consideration will be given to a case in which a high order IP address of an input packet is "0001" and matches the entry 121-1 ("0001") of the TCAM 120-1 corresponding to the routing entry 1101-1 of FIG. 13.

When it is judged that low order bits of the destination IP address are not "0100" and do not match the IP address condition of the routing entry 1101-1 of FIG. 13, an entry to be matched is a routing entry 1101-4 in which high order bits of the IP address condition are "0001".

Thus, a table address of the entry 141-1 in the intermediate search table A 140 becomes "4". Thus, the table address of the entry **141-*i* whose search continuation information is "1" is similar to that of the routing entry whose matching is established in the search of the step 1003 and in which a prefix length is "4" or less, among the parent routing entries of the routing entries corresponding to the entry 121-*i* matched in the step 1003**.

When the search continuation information is "0", the search control unit 110 reads the next hop IP address and the output port number of the search result table 160 shown in FIG. 9 corresponding to the table address (step 1011), transmits the information as packet output line information 22 to the packet receiving circuit 230 (step 1012), and finishes the routing table search (step 1013).

On the other hand, when the search continuation information is "1", the search control unit 110 inputs the low order 4 bits of the destination IP address in the destination IP address storage 180, the key information read in the step 1004, and the bit position information "1" indicating the input of the low order bits of the destination IP address as search keys to the TCAM 120 (step 1006).

The TCAM 120 executes comparison for matching with the set entry 131-1, outputs a smallest address (bit length of a prefix part is large) among addressees of matched entries 131 to the search control unit 110, and notifies presence of no matched entries to the search control unit 110 when there is no matched entry 131 (step 1007).

Figure 8:
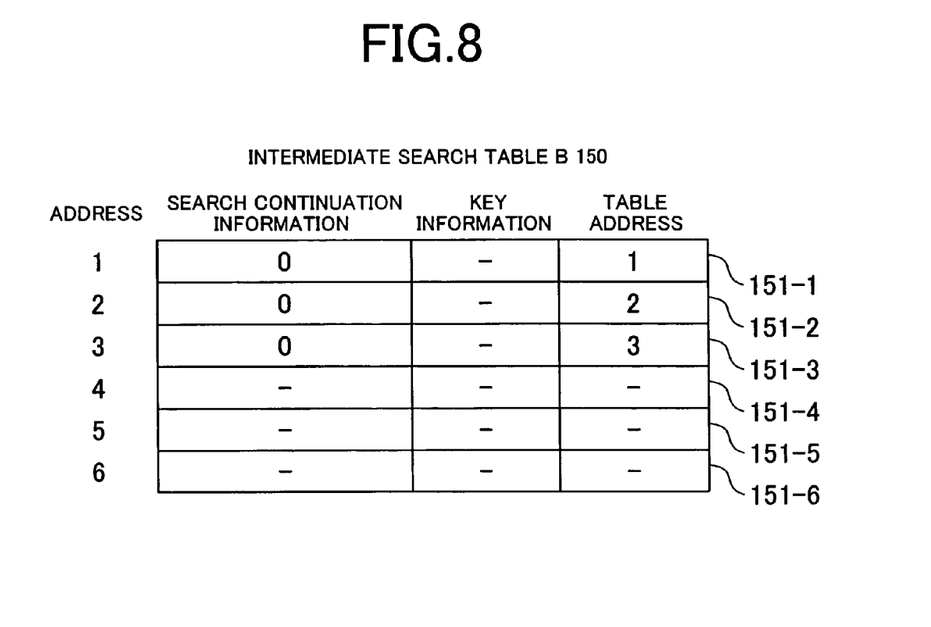
FIG. 8 is an explanatory diagram showing a format of an intermediate search table B.

When there is a matched entry 131, the search control unit 110 reads entries **151-*i* (i=1 to 6) of the intermediate search table B 150 corresponding to an output address (step 1009**).

FIG. 8 shows a format of the intermediate search table B 150. The format of the table is similar to that of the intermediate search table A 140 of FIG. 7. Each of the entries **151-*i* (i=1 to 6) includes search continuation information, key information, and a table address. The search continuation information are all "0" because search for all the bits has been finished, and no key information is set. As table addresses, addresses "1", "2", and "3" of the search result table corresponding to the routing entries 1101-1, 1101-2, and 1101-3 of FIG. 13** are set.

The search control unit 110 reads a next hop IP address and an output port number corresponding to the read table address (step 1010), transmits them as packet output line information 22 to the packet receiving circuit 230 (step 1012), and finishes the searching process (step 1013).

On the other hand, when there is no matched entry, the search control unit 110 reads the next hop IP address and the output port number corresponding to the table address read from the intermediate search table A 140 in the step 1004 (step 1011), transmits them as the packet output line information 22 to the packet receiving circuit 230 (step 1012), and finishes the searching process (step 1013).

The routing table search unit 100 of this invention first compares the high order bits of the destination IP address with the set IP address condition high order bits by using the TCAM 120-1. When the search continuation information is "0", the searching process can be finished by executing the search only of the TCAM 120 in the step 1003.

In the case where the search control unit 110 is realized by a CAM control device such as ASIC or a network processor different from the TCAM, when search continuation information is "0", a search key input to the TCAM 120 is high order bits only of the destination IP address. Accordingly, the routing table search unit 100 of this invention can effectively use an input bandwidth of a search key between the TCAM 120 and the search control device compared with the conventional example of the Nonpatent Document 1. Further, since the TCAM 120 only need compare the high order bits of the destination IP address with the IP address high order bits, search resources of the TCAM 120 can be effectively utilized. Thus, when the search performance of the TCAM is a bottleneck in operational performance, the routing table search unit 100 of this invention can execute routing table search faster than the routing table search unit of the conventional example of the Nonpatent Document 1. Furthermore, even when the search continuation information is "1", since it is not necessary to input a plurality of identical search keys to the TCAM 120, the input bandwidth of the search key between the TCAM 120 and the search control device can be effectively used compared with the conventional example of JP 2000-358064 A.

This embodiment has been described by way of case in which high order bits are 4 bits and low order bits are 4 bits. The setting in the address boundary storage 170 can be realized in a manner that the management terminal 10 shown in FIGS. 1 and 4 sends "INSTRUCTION OF WRITING IN ADDRESS BOUNDARY STORAGE 170" and "BIT LENGTH OF HIGH ORDER BITS" to the search control unit 110 through the processor 280.

Figure 6:
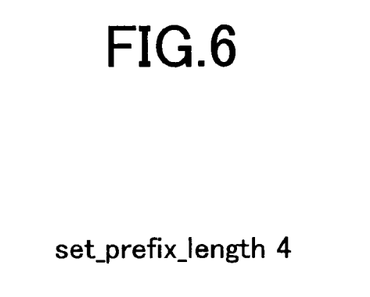
FIG. 6 is an explanatory diagram showing an example of a command for setting a bit length of high order bits.

FIG. 6 shows an example of an input screen of the management terminal 10 when a bit length of high order bits is "4". In the drawing, "set_prefix_length" on the left side represents a command for setting a bit length of high order bits, and "4" on the right side represents a bit length to be set.

Figure 12:
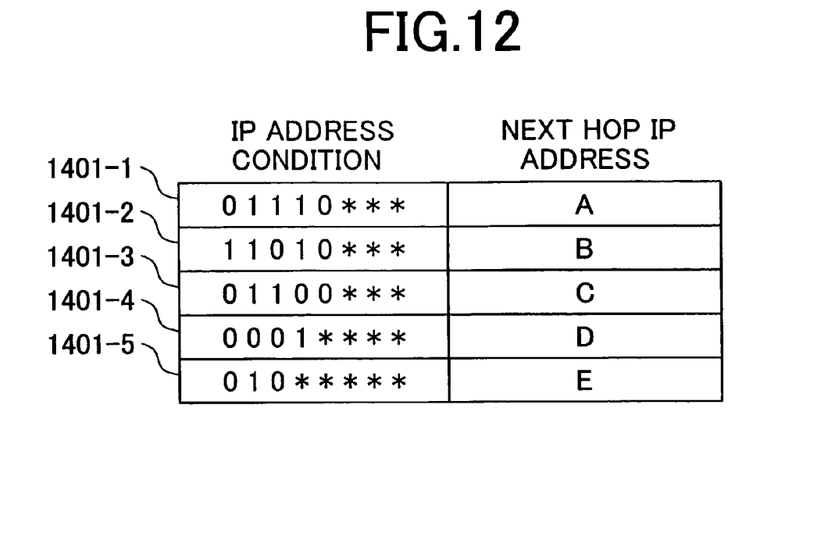
FIG. 12 is an explanatory diagram showing an example of five routing entries.

A network administrator who arranges the router 200 of this invention in the network changes the high order bits of the IP address condition according to a distribution of prefix lengths of routing entries. For example, in the case where there are many routing entries having a certain prefix length or less, when a high order bits length is set equal to the prefix length, routing table search is enabled in which a waste of the input bandwidth of the search key between the TCAM 120 and the search control device or the search resources of the TCAM 120 is limited to a minimum. For example, when there are five routing entries 1401-*j* (j=1 to 5) shown in FIG. 12, a high order bits length of the IP address condition may be set to 5 bits.

The description has been made of this embodiment of the routing table search unit which executes the routing table search by the search of the TCAM 120 executed up to twice, and reduces the waste of the search resources of the TCAM 120 or the input bandwidth of the search key between the TCAM 120 and the CAM search device. However, there is still room for using the resources more efficiently.

As an example, consideration will be given to a case in which a packet of a destination IP address to be matched with the routing entry 1101-3 of FIG. 13 arrives. In the search of the step 1003, matching with the entry 121-2 of the TCAM 120-1 is judged, and search continues. At this time, matching with the routing entry 1101-3 is judged when 1-bit search is executed. However, 4-bit search is carried out to waste the search resources of the TCAM 120 and the input bandwidth of the search key. To realize more efficient use of the search resources of the TCAM 120 and the input bandwidth of the search key, routing table search is realized by TCAM search executed up to three times, and a searching process of 4 bits→1 bit→3 bits is carried out, whereby a high-speed routing table searching process can be performed.

In the case of dividing the search into M (>2) times, and executing the search sequentially from high order bits of the IP address condition, the routing table search unit 100 includes M intermediate search tables K-1 to M, the TCAM 120 is logically divided into M TCAMs, and M-1 address boundaries 1 to M-1 are set in the address boundary storage 170.

Figure 11:
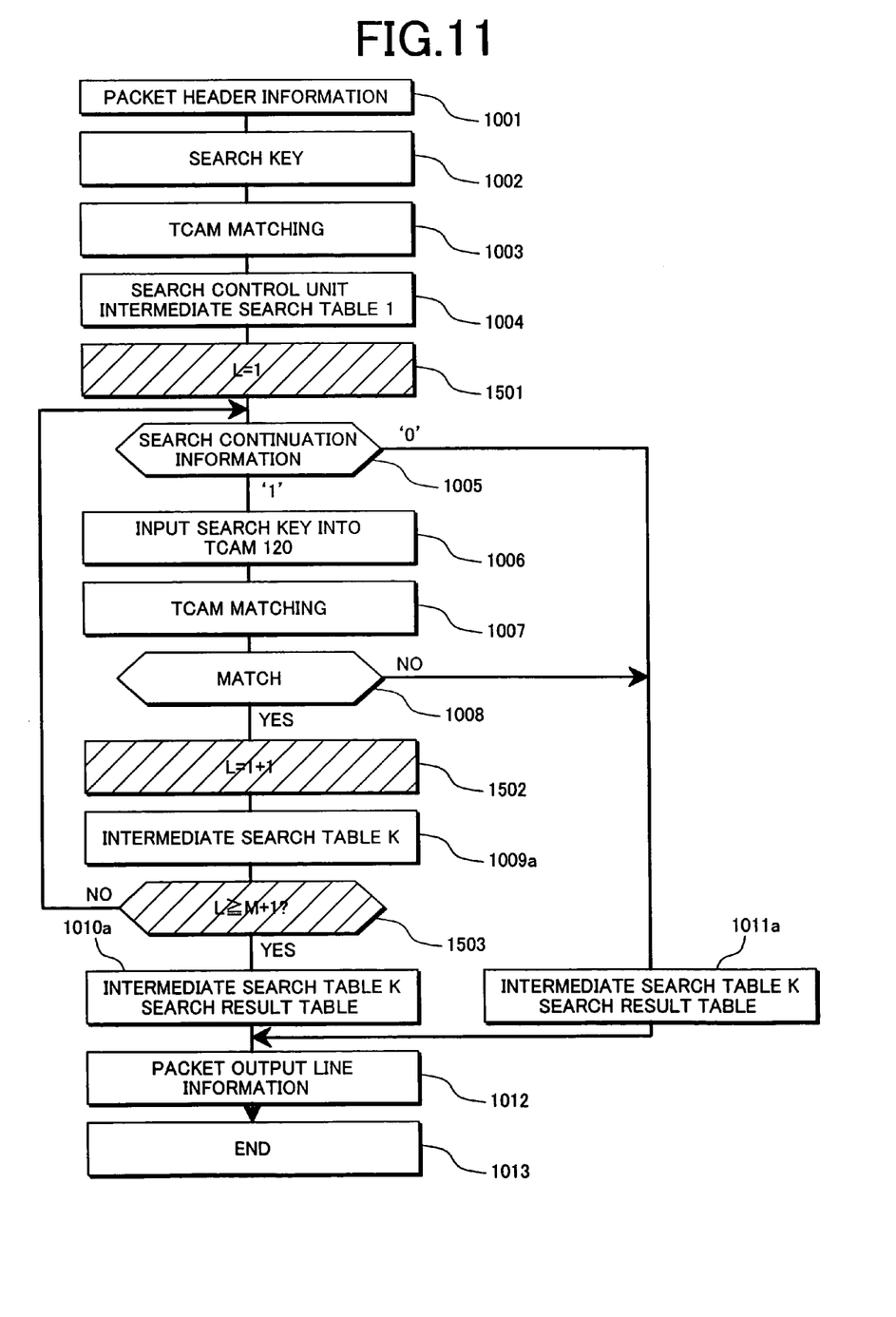
FIG. 11 is a flowchart showing another example of a process executed in the routing table search unit.

The flowchart of the searching process shown in FIG. 11 is constituted by adding steps 1501 to 1503 of forming a loop to execute the search by the M times to the flowchart of FIG. 10, and other steps are similar.

Referring to FIG. 11, the number of loops is set to 1 in the step 1501. Subsequently, if there is a matched entry, L is incremented in the step 1502, and in the step 1503, the loop is continued until the number of loops reaches a predetermined number of times M.

Then, in a step 1007, bit position information corresponding to the number of searching times: L and information of a part of a destination IP address to be searched for which is decided by the number of searching times: L and address boundaries 1 to M-1 are input as search keys to the TCAM 120. In a step 1009*a*, a next hop IP address and an output port number are read from each of intermediate search tables K-1 to M.

In other words, referring to FIG. 11, in steps 1010*a* and 1011*a*, the next hop IP address and the output port number of the search result table 160 are read by using the table address of the intermediate search table K. It should be noted that the intermediate search tables K-1 to M may be constituted as in the case of the intermediate search table B 150 of FIG. 8. Other operations are similar to those of the case of M=2 of FIG. 10.

Thus, irrespective of a prefix length, destination information can be searched from a destination IP address at a high speed. Additionally, since only a part of an IP address to be compared need be set in the CAM entry, it is not necessary to write all the IP addresses unlike the conventional example, the TCAM 120 can be used without any wastes, and the expensive TCAM 120 of large power consumption can be effectively used.

According to the conventional example of JP 2000-358064 A, IP address 3 bits are set in the CAM in the reference, and when a packet which hits an entry of a 6-bit prefix length is input, 3-bit tree search must be carried out. A problem is small in the case of a short bit length such as the 3-bit length. However, in the case of a long bit length such as an IPv6 address, a bit number for tree search executed at a second stage may become longest (e.g., 64 bits), making high-speed search difficult.

According to the conventional example of JP 2000-358064 A, for example, an entry having a 3 to 5-bit prefix length is set in a CAM-1, and an entry having a 6 to 8-bit prefix length is set in a CAM-2. In this case, when a packet which hits the entry of the prefix length of 6 bits is input, search need be executed in the CAM-1. Thus, it is possible to execute search at an extremely high speed.

However, when a packet which hits the entry of the prefix length of 3 bits is input, search must also be executed in the CAM-2. In this case, a search key of 6 bits (for CAM-1)+3 bits (for CAM-2) is input to the CAM, and high order 3 bits are input to the CAM twice, thereby wasting resources of the CAM.

In other words, high-speed search is impossible when a packet which hits the entry of the prefix length of 6 bits is input.

On the other hand, according to this invention, concerning setting of high order 6 bits in the TCAM, only a 6-bit search key need be input to the TCAM for both cases in which a packet hits an entry of a prefix length of 6 bits and a packet hits an entry of 3 bits. Accordingly, it is possible to reduce a necessary capacity of the TCAM (or CAM) compared with the conventional example by effectively using the expensive TCAM. Thus, by applying this invention, manufacturing costs of a packet forwarding device such as the router 200 are reduced, whereby an inexpensive and high-performance packet forwarding device can be provided.

As described above, according to this invention, the routing table search can be carried out at a high speed by effectively using the search resources of the CAM and the input bandwidth of the search key between the CAM and the search control device. Thus, this invention can be applied to a packet forwarding device such as a high-speed router or an L3 switch.

While the present invention has been described in detail and pictorially in the accompanying drawings, the present invention is not limited to such detail but covers various obvious modifications and equivalent arrangements, which fall within the purview of the appended claims.

What is claimed is:

1. A packet forwarding device comprising:
   an input line through which a packet is input;
   a plurality of output lines through which packets are output;
   a routing table search unit which comprises a plurality of routing entries containing destination address conditions set to designate matching conditions for bits of destination addresses and forwarding information set for the destination address conditions, searches for the destination address condition to match a destination address of the packet input through the input line, and sets a destination of the packet matching the destination address condition in forwarding information corresponding to the destination address condition; and
   a packet forwarding unit which forwards the packet to one of the plurality of output lines corresponding to the forwarding information,
   wherein the routing table search unit comprises:
   a TCAM which comprises a first TCAM entry to set high order bits of the destination address conditions;

a first search unit which compares high order bits of the destination address of the input packet with the first TCAM entry to search for a matching destination address condition;

a second search unit which searches for a matching destination address condition based on low order bits of the destination address of the packet when no destination address condition corresponding to the high order bits of the destination address is uniquely decided based on a result of the searching; and a forwarding information storage which sets forwarding information of the packet based on a destination address condition uniquely corresponding to the destination address of the packet retrieved by one of the first and second search units.

2. The packet forwarding device according to claim 1, wherein:

the TCAM further comprises a plurality of regions including the first TCAM entry to set the high order bits of the destination address conditions, and a second TCAM entry to set low order bits of the destination address conditions; and the second search unit compares the low order bits of the destination address of the packet with the second TCAM entry to search for a matching destination address condition when no destination address condition corresponding to the high order bits of the destination address of the packet is uniquely decided based on a search result of the first search unit.

3. The packet forwarding device according to claim 2, wherein:

the destination address condition comprises a prefix part which sets the high order bits of the destination address to one of "0" and "1" for each bit, and a mask part which indicates no designation of low order bits of a destination address;

the prefix part has low order bits set in the second TCAM when a bit length of the prefix part exceeds a bit length to be set in the first TCAM; and the first search unit selects, among prefix parts matching the high order bits of the destination address, the first TCAM entry of a longer prefix part as a destination address condition which matches the destination address of the packet.

4. The packet forwarding device according to claim 3, wherein:

the routing table search unit comprises:

a search result table in which forwarding information is set for each table address corresponding to the destination address condition of the search result of one of the first and second search units; and a first intermediate search table in which a final table address storage to store the table address of the search result table, a search continuation information storage to store search continuation information as an identifier indicating whether execution of searching is necessary or not by the second search unit after the searching by the first search unit, and a key information storage to store key information uniquely corresponding to the first TCAM entry are set according to the search result of the first search unit; and the first search unit compares the high order bits of the destination address of the packet with the first TCAM entry, obtains search continuation information from the first intermediate search table corresponding to the search result, refers to the search result table from the table address of the final table address storage to set forwarding information when the search continuation information indicates nonnecessity of searching by the second search unit, and executes searching by the second search unit based on the key information and the low order bits of the destination address when the search continuation information indicates necessity of the searching by the second search unit.

5. The packet forwarding device according to claim 4, wherein when there is no destination address condition in which a bit length of a prefix part is longer than the destination address condition matched by the first search unit as a result of the searching by the second search unit, based on the table address corresponding to the search result of the first search unit, forwarding information is obtained from the search result table to be set in the packet.

6. The packet forwarding device according to claim 1, wherein:

the routing table search unit further comprises an address boundary storage which sets a bit length of the high order bits of the destination address condition; and the high order bits of the destination address condition is set based on the bit length.

7. The packet forwarding device according to claim 3, wherein each of the first and second TCAM entries contains bit position information to identify whether each entry thereof is high order bits or low order bits.

8. A packet forwarding device comprising:

an input line through which a packet is input;

a plurality of output lines through which packets are output;

a routing table search unit which comprises a plurality of routing entries containing destination address conditions set to designate matching conditions for bits of destination addresses and forwarding information set for the destination address conditions, searches for the destination address condition to match a destination address of the packet input through the input line, and sets a destination of the packet matching the destination address condition in forwarding information corresponding to the destination address condition; and a packet forwarding unit which forwards the packet to one of the plurality of output lines corresponding to the forwarding information, wherein the routing table search unit comprises:

a TCAM which comprises a plurality of regions including a first TCAM entry to sequentially set high order bits of the destination address conditions and second to M-th TCAM entries to divide low order bits of the destination address conditions into (M-1) pieces by predetermined lengths and set the bits;

a first search unit which compares high order bits of the destination address of the input packet with the first TCAM entry to search for a matching destination address condition;

a second search unit which compares the low order bits of the destination address of the packet sequentially with the second to M-th TCAM entries to search for a matching destination address condition when no destination address condition corresponding to the high order bits of the destination address is uniquely decided based on a result of the searching; and a forwarding information storage which sets forwarding information in the packet based on a destination address condition uniquely corresponding to the destination address of the packet retrieved by one of the first and second search units.

9. The packet forwarding device according to claim 8, wherein:

the routing table search unit comprises a second intermediate search table comprising search continuation to instruct search continuation of the second search unit, key information uniquely corresponding to each of the second to M-th TCAM entries, and a search result table to store forwarding information in routing entries corresponding to the second to M-th TCAM entries for each table address;

the forwarding information is set in the packet based on a table address corresponding to a final search result among search results of the second to M-th TCAM entries when the search continuation information corresponding to the second to M-th TCAM search results indicates nonnecessity of continuation; and the forwarding information of the packet is set by using the destination addresses unused in the past searching and destination address conditions unset as the second to M-th TCAM entries when the search continuation information corresponding to the second to M-th TCAM search results indicates necessity of continuation.

10. The packet forwarding device according to claim 8, wherein:

the routing table search unit comprises a second address boundary storage which sets bit lengths of destination addresses set in the second to M-th TCAM entries among the destination address conditions; and searching is executed by the second search unit according to the bit lengths stored in the second address boundary storage.

* * * * *